United States Patent [19]
Takeuchi

[11] Patent Number: 5,910,825
[45] Date of Patent: Jun. 8, 1999

[54] VIDEO SIGNAL TRANSMITTING APPARATUS WITH ATTENDANT DATA INSERTION AND EXTRACTION FUNCTIONS

[75] Inventor: Hajime Takeuchi, Kanagawa, Japan

[73] Assignee: Sony Corporation, Tokyo, Japan

[21] Appl. No.: 09/086,211

[22] Filed: May 28, 1998

Related U.S. Application Data

[63] Continuation-in-part of application No. 08/750,859, Mar. 3, 1997.

[30] Foreign Application Priority Data

May 9, 1995 [JP] Japan ................................ P07-136177

[51] Int. Cl.$^6$ ...................................................... H04N 7/08
[52] U.S. Cl. ............................................ 348/722; 348/478
[58] Field of Search ..................................... 348/722, 232, 348/236, 235, 705, 478, 74, 584, 589, 598, 473

[56] References Cited

U.S. PATENT DOCUMENTS

| | | | |
|---|---|---|---|
| 5,111,306 | 5/1992 | Kanno et al. | 348/74 |
| 5,115,310 | 5/1992 | Jakano et al. | 348/722 |
| 5,335,072 | 8/1994 | Tanaka et al. | 348/232 |
| 5,515,101 | 5/1996 | Yoshida | 348/232 |
| 5,537,151 | 7/1996 | Orr et al. | 348/588 |
| 5,541,663 | 7/1996 | Ohno | 348/478 |

Primary Examiner—Victor R. Kostak
Attorney, Agent, or Firm—Jay H. Maioli

[57] ABSTRACT

In a video signal transmitting apparatus which edits video data by a plurality of editing units, after the video data made in a shooting unit is stored in a video data storing unit, attendant information is added to the video data. The attendant information is subsequently extracted and used as a keyword in a database in the video data storing unit, thereby facilitating editing of the video data. Therefore, construction of a database and editing of video data can be performed easily and correctly.

3 Claims, 10 Drawing Sheets

| | |
|---|---|
| 0~1 | SYNCHRONIZING BITS |
| 2~5 | THE FIRST DIGIT OF FRAME |
| 6~9 | USER'S BITS 1 |
| 10~11 | SYNCHRONIZING BITS |
| 12~13 | THE SECOND DIGIT OF FRAME |
| 14 | DISPLAY OF DROP FRAME |
| 15 | RESERVED AS COLOR FRAME ID |
| 16~19 | USER'S BITS 2 |
| 20~21 | SYNCHRONIZING BITS |
| 22~25 | THE FIRST DIGIT OF SECOND |
| 26~29 | USER'S BITS 3 |
| 30~31 | SYNCHRONIZING BITS |
| 32~34 | THE SECOND DIGIT OF SECOND |
| 35 | FIELD MARKS ( "0"...1ST, 3RD FIELDS / "1"...2ND, 4TH FIELDS ) |
| 36~39 | USER'S BITS 4 |
| 40~41 | SYNCHRONIZING BITS |
| 42~45 | THE FIRST DIGIT OF MINUTE |
| 46~49 | USER'S BITS 5 |
| 50~51 | SYNCHRONIZING BITS |
| 52~54 | THE SECOND DIGIT OF MINUTE |
| 55 | "0" ZERO |
| 56~59 | USER'S BITS 6 |
| 60~61 | SYNCHRONIZING BITS |
| 62~65 | THE FIRST DIGIT OF HOUR |
| 66~69 | USER'S BITS 7 |
| 70~71 | SYNCHRONIZING BITS |
| 72~73 | THE SECOND DIGIT OF HOUR |
| 74~75 | "0" ZERO |
| 76~79 | USER'S BITS 8 |
| 80~81 | SYNCHRONIZING BITS |
| 82~89 | CRC CODE (CYCLIC REDUNDANCY CHECK CODE) |

VIDEO SIGNAL TRANSMITTING APPARATUS WITH ATTENDANT DATA INSERTION AND EXTRACTION FUNCTIONS

CROSS REFERENCE TO RELATED APPLICATIONS

This application is a continuation in part of U.S. application Ser. No. 08/750,859 filed Mar. 3, 1997.

TECHNICAL FIELD

This invention relates to a video signal transmitting apparatus suitable for use in a broadcasting system of a broadcasting station.

BACKGROUND

Heretofore, broadcasting systems have adopted a method in which information, such as title, shooting time and date, cameraman, and shooting scene (hereinafter, referred to as attendant information), are added to news materials to identify and manage video shots or segments when a video signal of the news materials is transmitted from the shooting scene to a broadcasting station to make editing of news television programs easier.

Figure 1:
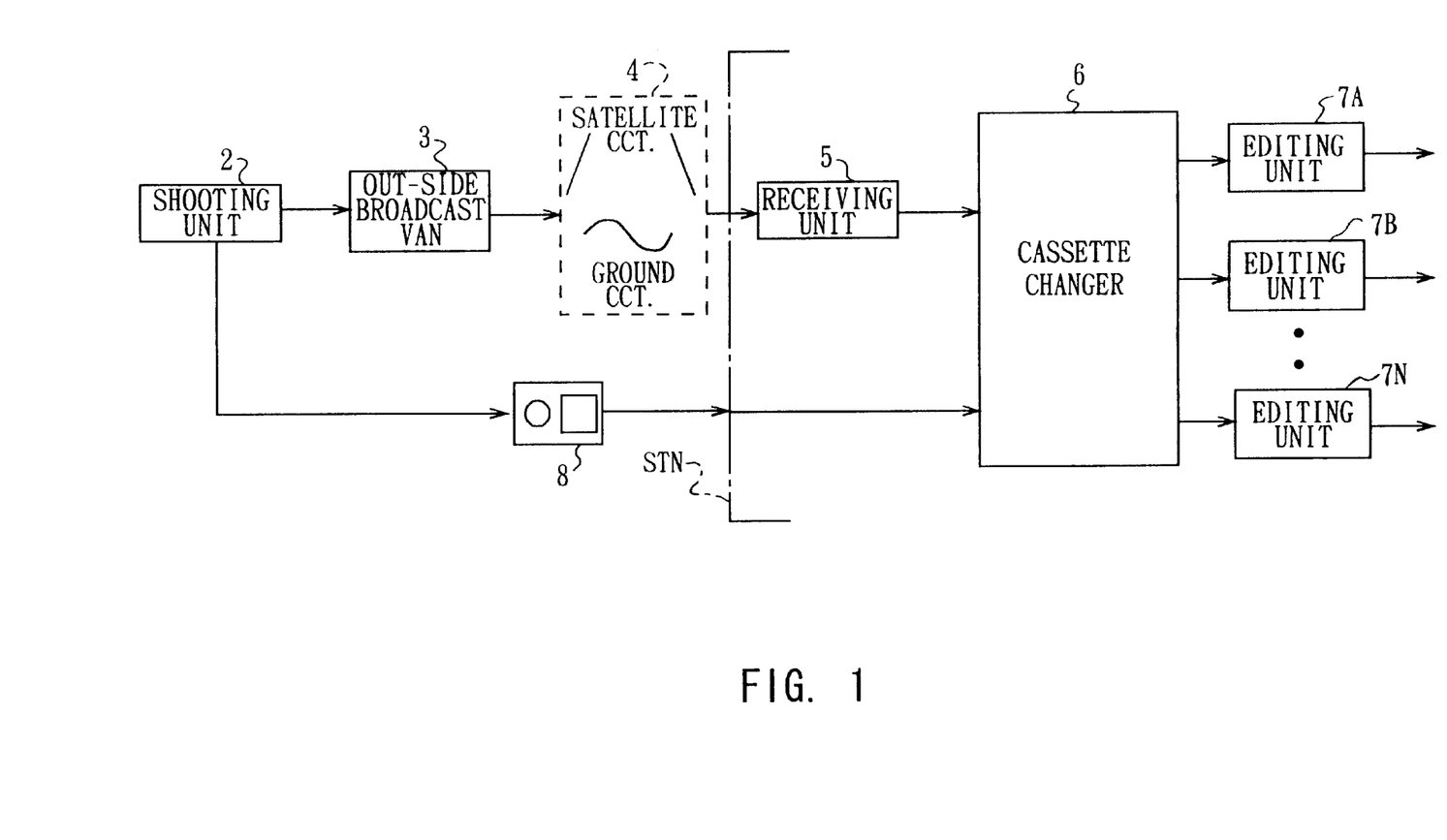
FIG. 1 is a block diagram showing a conventional broadcasting system.

More specifically, in a broadcasting system such as shown in FIG. 1, a video signal, obtained by shooting a video segment at a shooting scene using a shooting unit 2 containing a television camera, etc., is transmitted from an outside broadcast van 3 to a broadcasting station STN via a transmission line 4 using a satellite circuit or a ground circuit.

A receiving unit 5 of the broadcasting station STN stores the transmitted video signal for each item of news material in a recording medium in a large-capacity video signal storing unit 6 such as, for example, a cassette changer. The video signal of each item of news material stored in the video signal storing unit 6 is selectively picked up in accordance with an editing operators' commands from a plurality of editing units 7A to 7N and edited for news television programs to be aired.

Here, the editing operators of the respective editing units 7A to 7N refer to the attendant information using keyword information representing the contents of the news materials during editing.

Also, in the case where the video signal of the news materials is recorded in a recording medium 8 which is a video tape or the like and delivered directly to the broadcasting station, the recording medium 8 containing the video signal made in the shooting unit 2 is stored in the video signal storing unit 6 as is.

The attendant information is added to the video signal for each item of news material and transmitted to the broadcasting station STN as described above, so that the editing operators can edit at the broadcasting station while confirming "when the video is shot", "where the video is shot", "who shot the video", and/or "what is the video", by using the attendant information as keyword information.

Figure 2:
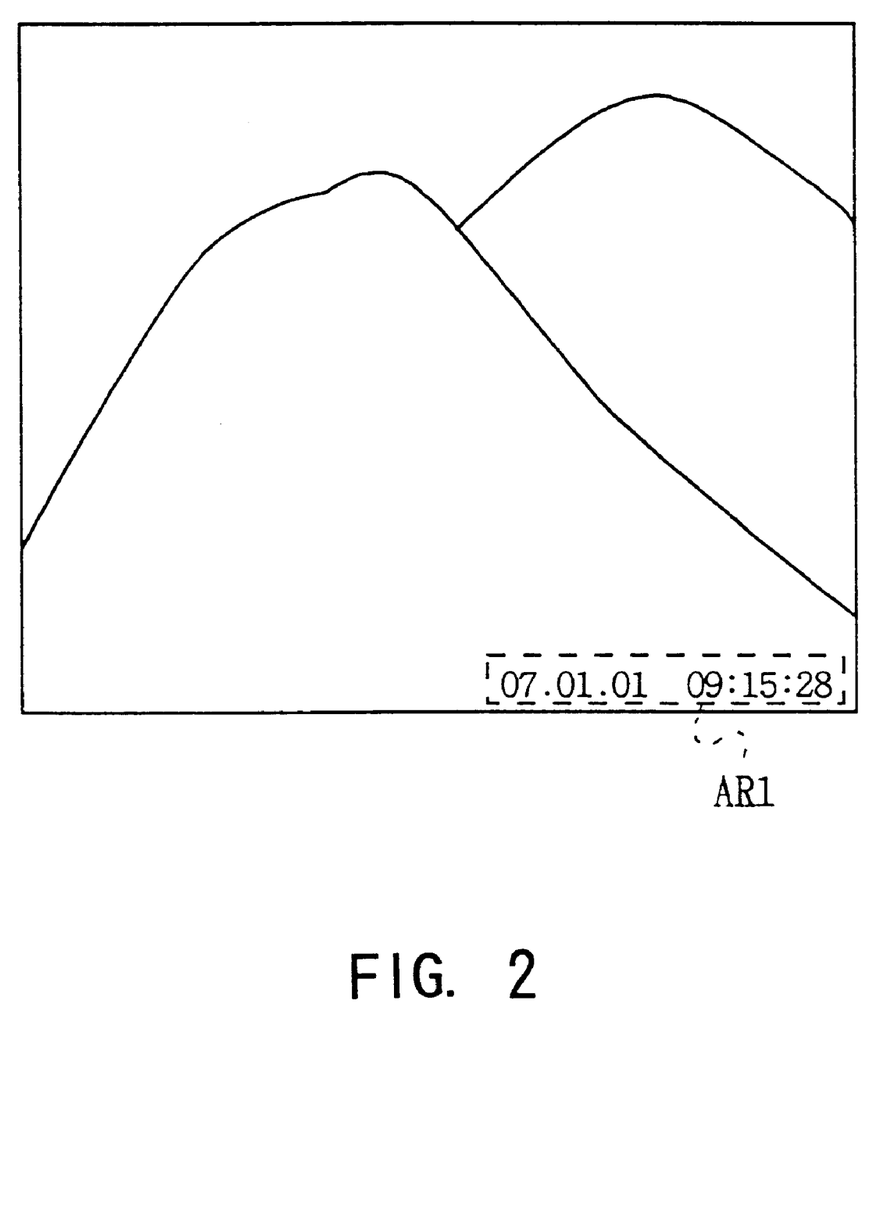
FIG. 2 is a schematic diagram explaining a method of adding attendant information.

In the aforesaid structure of the broadcasting system 1, a method of adding the attendant information to the video signal is by superimposing it on the video signal. However, when using such a method, as shown in FIG. 2, the attendant information AR1 appears on a screen, so it cannot be used as video for broadcasting. Therefore, in practice the attendant information is superimposed only at the head of the video when the subject to be covered is shot by the shooting unit 2, or the attendant information is formed by voice instead of by superimposing it at the head of the video.

Further, a method is used in which a circuit different from a circuit for transmitting the video signal is set up to transmit the attendant information, the attendant information is printed with bar-code on a label, etc., and the label is affixed to the recording medium 8. In this method, a signal memory unit only for the attendant information is provided separately from the video signal storing unit. The correspondence between the attendant information stored in the signal memory unit and the video signal stored in the video signal storing unit (the portion of the video signal storing unit the video signal corresponding to the attendant information is stored in allows the absolute address number in which the video signal is stored to be generally added to the attendant information) is performed in accordance with the decision of the operators.

The video signal to be transmitted in which the attendant information is added in the above-described way is displayed on a monitor (not shown) with the attendant information added by the editing operators in the editing units 7A to 7N. Then, it is confirmed whether or not the video signal is a desired video signal.

However, in the case of superimposing the attendant information at the head of the shot video, there is a problem that the contents of the video cannot be confirmed if the editing operators do not watch the head of the video for each item of news material. In the method using the different circuit, there is also a problem that it takes time to provide a circuit so it is impractical in an urgent situation. Further, when the recording medium 8 is located at a distant location, there is a problem that it takes time to deliver the recording medium 8.

Furthermore, in the method using the different circuit or adding the attendant information printed on a label to the recording medium, there is a problem that the attendant information may be separated from the video due to carelessness in the operation of the recording medium.

SUMMARY OF INVENTION

An object of this invention is to solve the above-mentioned problems and to provide a video signal transmitting apparatus which can easily and surely process the contents of a video signal of news materials when the video signal is handled, for example, to store the news materials or to edit the video signal.

In order to solve the above-mentioned problems, this invention provides a video signal transmitting apparatus comprising: a video data transmitting unit for adding attendant information to video data, generated by a shooting unit, in a different time area from the video data to produce transmission video data, and for outputting the transmission video data; a video data storage unit for receiving and storing the transmission video data; a database storage unit for extracting the attendant information from the transmission video data and storing the extracted attendant information as a keyword in a database; and editing units for editing the transmission video data stored in the video data storage unit based on the keyword stored in the database storage unit.

The video data, to which the attendant information has been added, generated in the video data transmitting unit, uses the attendant information as a keyword recorded in a database in the database storage unit. The video data stored with the keyword in the database storage unit is taken out by editing units to be edited. The added attendant information makes it possible to record the video data stored in the database and to edit the video data easily and surely.

Further, the video signal transmitting apparatus according to this invention comprises: a video data transmitting unit for forming transmission blocks in one field unit or one frame unit to generate transmission video data; and a video data receiving unit for receiving the transmission video data generated at the video data transmitting unit and reproducing the video signal. The video data transmitting unit includes attendant information inserting means for inserting the attendant information representing the contents of the video signal in a blanking interval in the transmission block.

The attendant information is inserted in the blanking interval in the transmission block of the transmission video data generated for each field or frame, so as to add the attendant information to the video data without preventing the video from being looked at and listened to.

Further, the attendant information is extracted from the transmission video data before displaying it, so that the contents of the video can be confirmed from the attendant information displayed separately from the video signal.

Further, the transmission video data is reproduced to extract only the attendant information from the transmission video data recorded with the attendant information, and the extracted attendant information is displayed. Therefore, the recorded video data can be retrieved and reused.

In this way, according to this invention, the attendant information representing the management contents of the video data is inserted in video data having a television signal format by utilizing user bits of the television signal format, so as to realize a video signal transmitting apparatus which can easily and surely store and use the video data, such as by having a database for the video data.

DETAILED DESCRIPTION OF PREFERRED EMBODIMENTS

Referring to the drawings, embodiments of this invention will be hereinafter described in detail, wherein like reference numerals refer to the same or similar elements.

Figure 3:
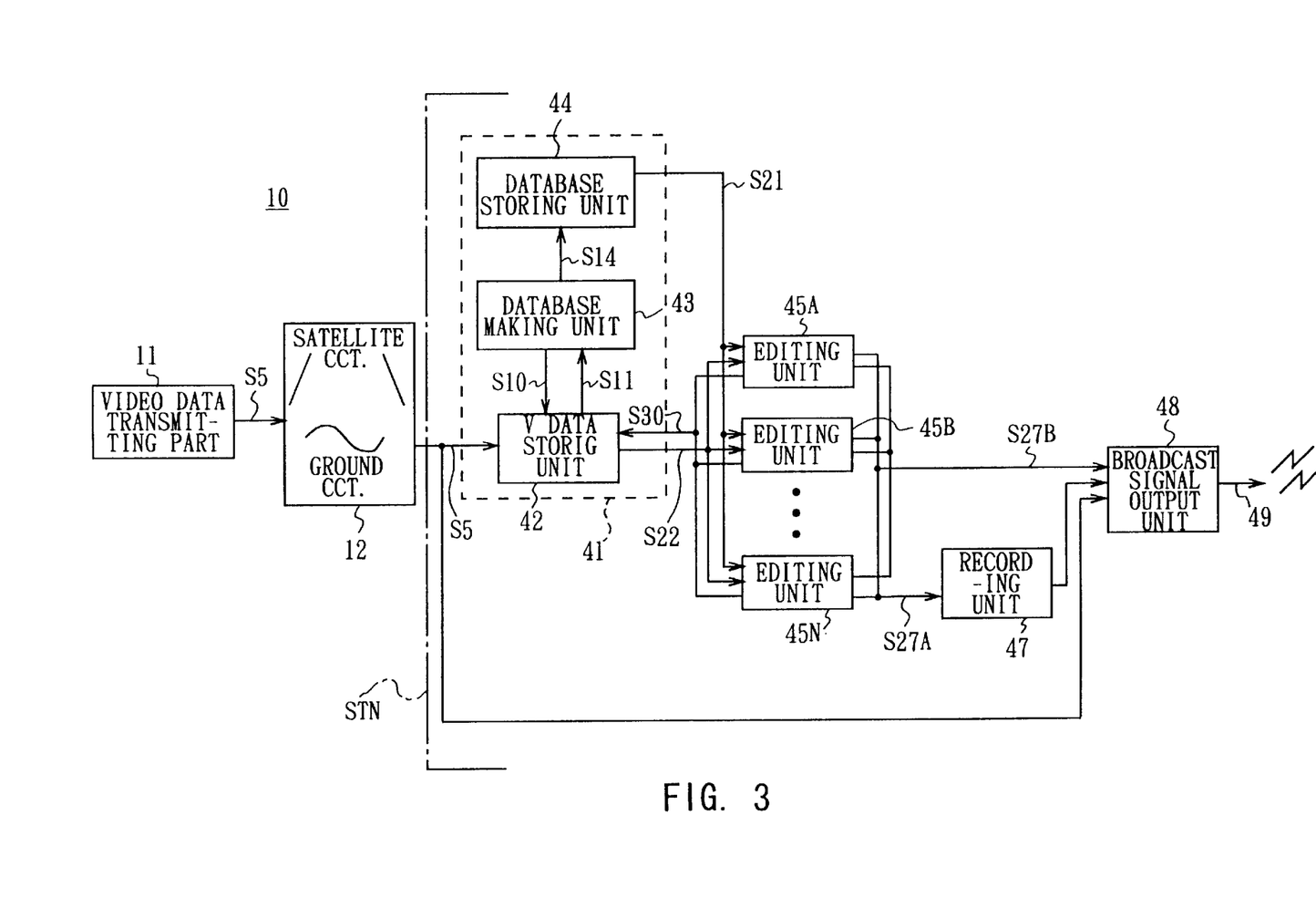
FIG. 3 is a block diagram showing an embodiment of the video signal transmitting apparatus according to this invention.

In FIG. 3, 10 shows a broadcasting system which is an embodiment of the video signal transmitting apparatus as a whole. A video signal of news materials generated in a video data transmitting unit 11 at a shooting scene, which is inserted with the attendant information in a part of the signal format, is transmitted as transmission video data S5 to a broadcasting station STN via a transmission line 12 using a satellite circuit or a ground circuit. The attendant information is extracted from the transmission video data S5 received at the broadcasting station STN to use in a signal process as the occasion demands.

Figure 4:
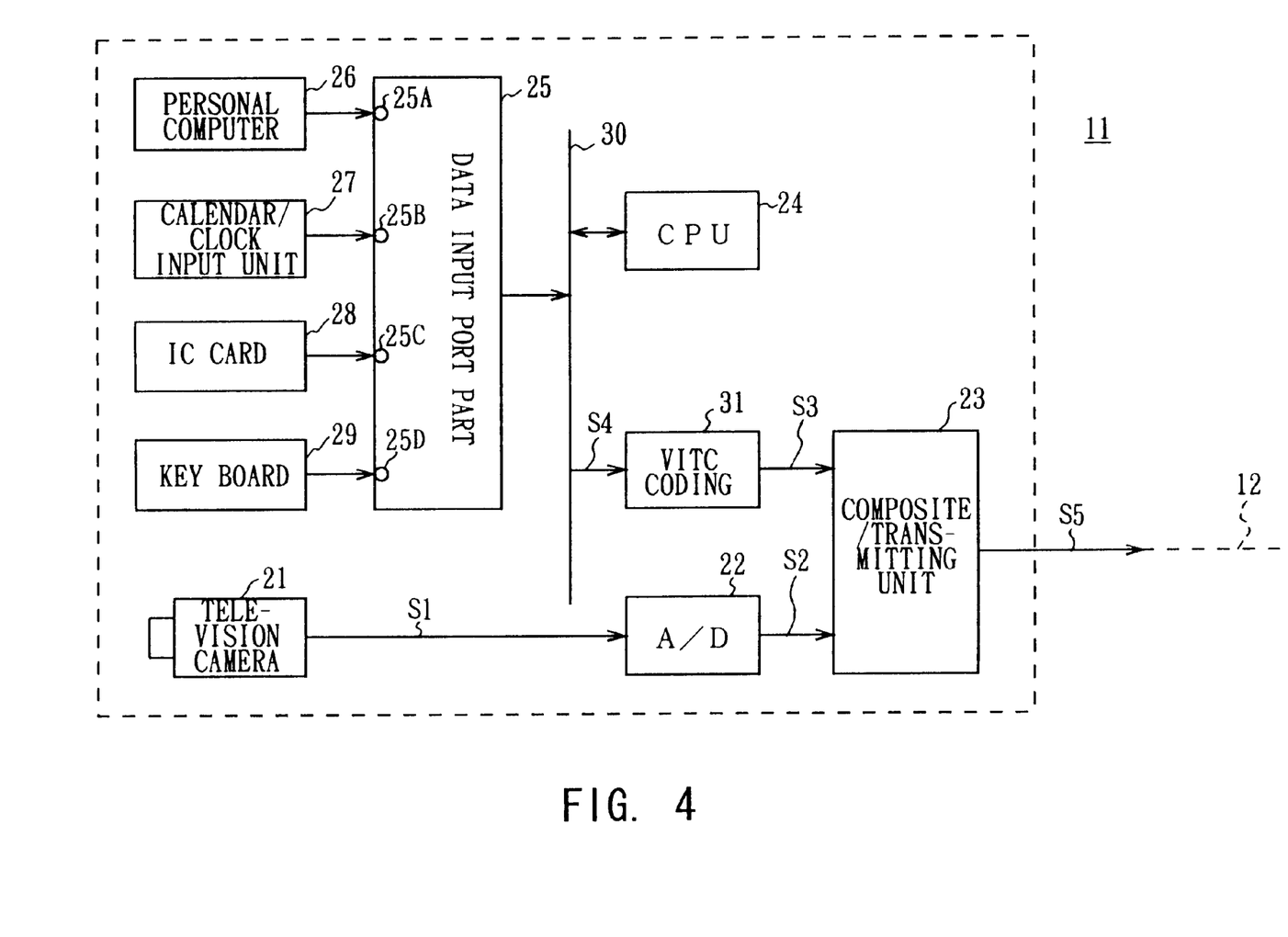
FIG. 4 is a block diagram showing a detailed structure of the video data transmitting part of FIG. 3.

In the video data transmitting unit 11, as shown in FIG. 4, the video to be covered is shot by a television camera 21 of a shooting unit, so that a video signal S1 of a specific format, e.g., the NTSC television format based upon the Electric Industries Association (EIA) standard RS170-A "Color Television Studio Picture Line Amplifier Output," is obtained and converted at an analog-to-digital converting circuit 22 into material video data S2 based upon the interface for transmission of composite digital video data of the Society of Motion Picture and Television Engineering (SMPTE) standard 259M and, thereafter, supplied to a composite/transmitting unit 23.

For the video shot by the television camera 21, the attendant information including "title", "shooting date and time", "cameraman", and "shooting scene" is specified as the attendant information representing the management contents of news materials video to be covered, and attendant information data S3 representing the attendant information is generated on the basis of a data processing operation by a central processing unit (CPU) 24, such as a microprocessor, and is supplied to the composite/transmitting unit 23.

In this embodiment, in the CPU 24, the input attendant information data S4, respectively input from a personal computer 26, a calendar/clock input unit 27, an IC card read unit 28, and a keyboard 29 which are connected to respective input ports 25A, 25B, 25C, and 25D of data input port part 25 when necessary, is supplied to a vertical interval time code (VITC) coding circuit 31 via a bus 30.

The personal computer 26 can input the title, shooting date and time, cameraman, and shooting scene, which have been previously assigned to the news materials shot by the television camera 21, in accordance with an operation of an operator at the shooting scene, while the news materials are being shot by the television camera 21.

The calendar/clock input unit 27 automatically inputs the shooting date and time data representing the shooting date and time, at the time when the news materials are shot by the television camera 21.

The IC card read out unit 28 stores a previously determined title, cameraman, and shooting scene as card information before a news reporter leaves the broadcasting station STN for the shooting scene. When the news materials are shot by the television camera 21, the operator at the broadcasting scene puts an IC card into the IC card readout unit 28 to input the card information.

The keyboard 29 can be used to input a title, shooting date and time, cameraman, and shooting scene by an operator at the broadcasting scene when the news materials are being shot by the television camera 21.

Thus, the CPU 24 selectively uses one or some of the personal computer 26, the calendar/clock input unit 27, the IC card read out unit 28, and the keyboard 29 in accordance with the situation at the scene where the news materials are being shot, and the input information is supplied to the bus 30 via the data input port part 25.

Figure 5A:
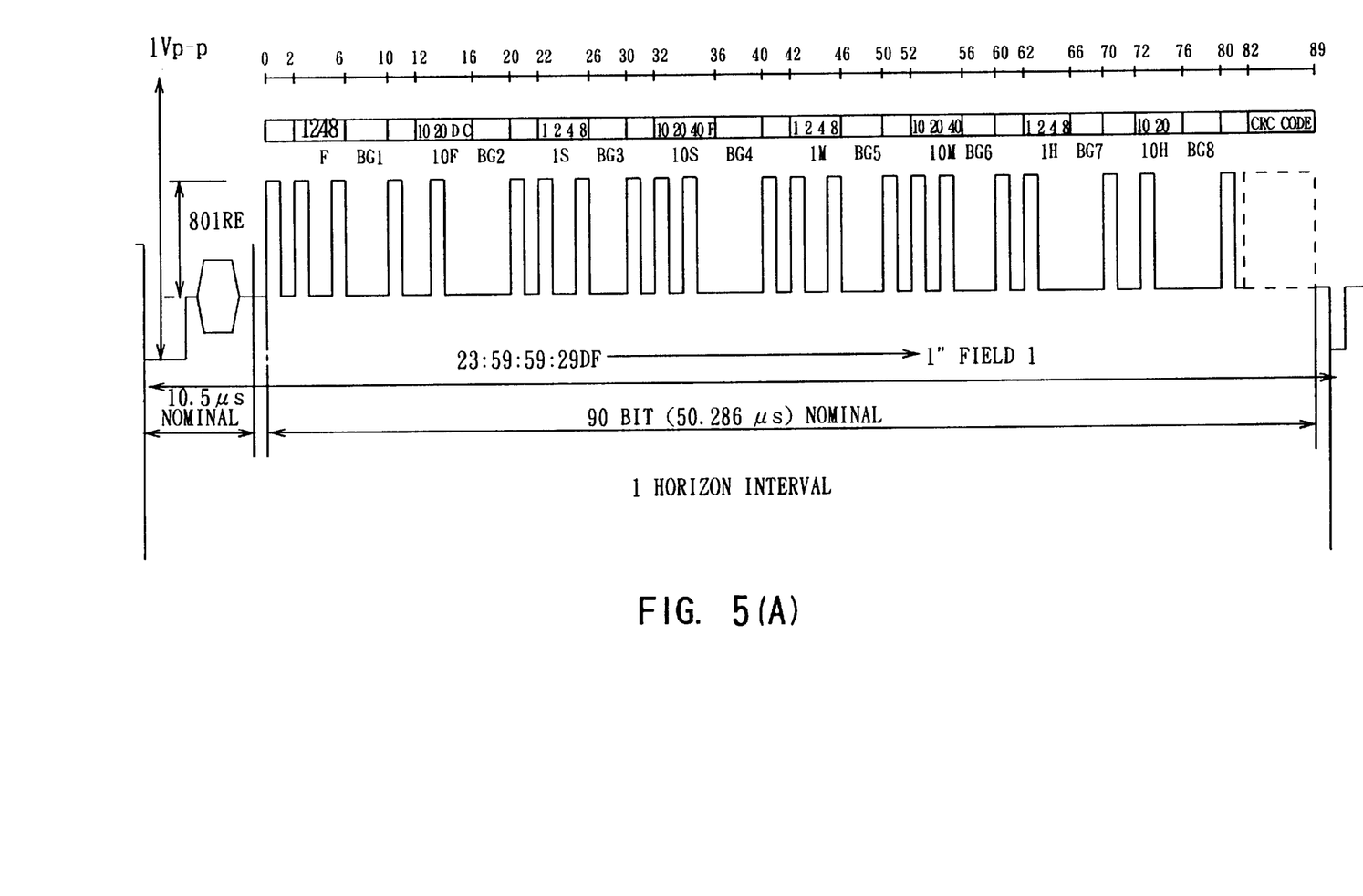
FIG. 5(A) is a schematic diagram showing the contents of VITC code.
Figure 5B:
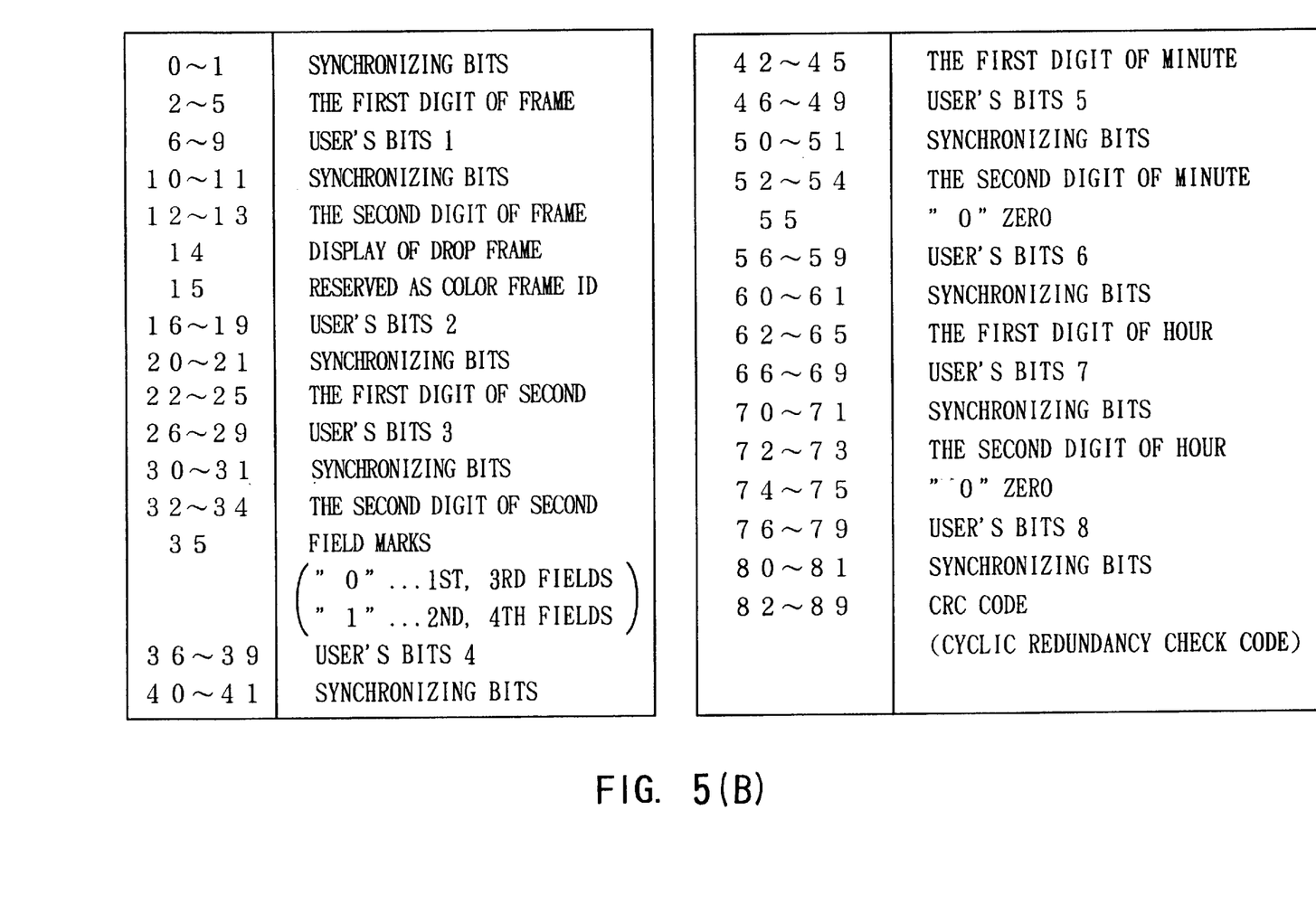
FIG. 5(B) is a table showing the contents of information assigned to respective bits of FIG. 5(A)

As shown in FIG. 5(A), among the data formats prepared is the vertical interval time code (VITC) in 1H interval at the 12th and 14th lines, and the video signal S1 for one field or one frame of the television signal of the NTSC television format obtained from the television camera 21 is shown in FIG. 5(B). The VITC coding circuit 31 operates such that the input attendant information data S4 input via the data input port part 25 is assigned 1st to 8th user's bits which are assigned to 6–9 bits, 16–19 bits, . . . , 76–79 bits. Therefore, the attendant information data S3 is supplied to the composite/transmitting unit 23 at a timing of the 1st to 8th user's bits of the material video data S2.

As a result, the composite/transmitting unit 23, using one field or one frame as one block, outputs to the transmission line 12 the transmission video data S5 in which the attendant information data S3 is dispersed and inserted at the 1st to 8th user's bits in the 1H interval at the 12th and 14th lines of the vertical blanking intervals.

The transmission video data S5 output from the video data transmitting unit 11 to the transmission line 12 is received by the receiving unit 41 (FIG. 3) of the broadcasting station STN and stored in the video data storing unit 42.

In this embodiment, the video data storing unit 42 has a capacity which is sufficient to store the transmission video data S5 for sixteen hours.

Figure 6:
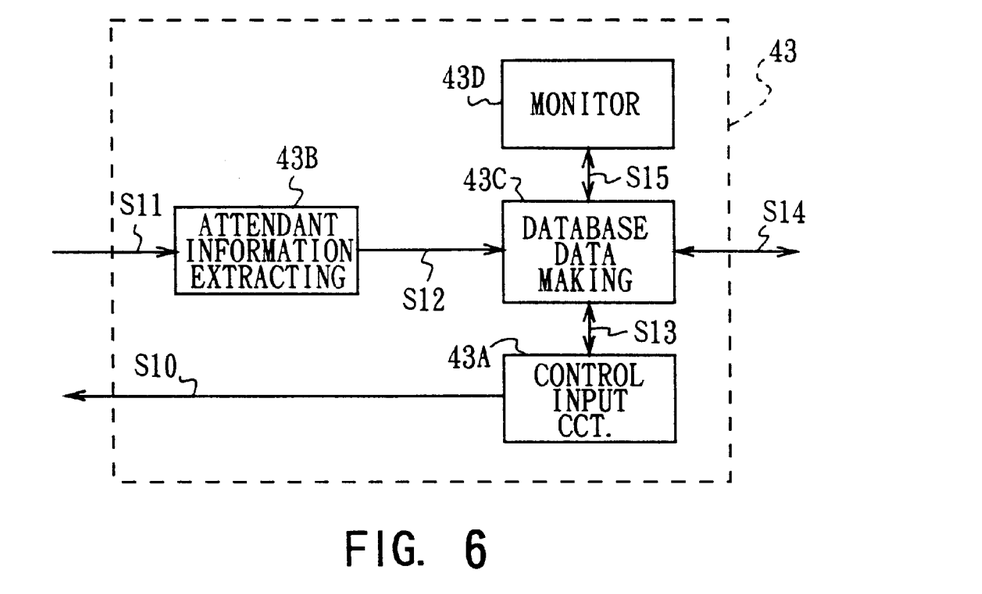
FIG. 6 is a block diagram showing a detailed structure of the database making unit of FIG. 3.

After the transmission video data of each news material is stored in the video data storing unit 42, the stored transmission video data of each item of news material, stored in a database making unit 43 shown in FIG. 6, is sequentially read out by a readout signal S10 supplied from a database making control input circuit 43A and the readout data S11 is supplied to an attendant information extracting circuit 43B.

The attendant information extracting circuit 43B extracts the attendant information S12, which is assigned to the news materials, from the 1 H interval of the 12th and 14th lines of the readout data S11 and supplies it to a database data making circuit 43C.

The database data making circuit 43C makes database data S14 in which address data representing the absolute address in a memory area of the video data storing unit 42 is added to the extracted attendant information S12, sequentially stores it in the database storing unit 44, and supplies display information S15 to display the database data to the monitor 43D.

Thus, operators at the broadcasting station STN can store the news materials which have been stored in the video data storing unit 42 in the database storing unit 44 as a database, can retrieve one or some of the contents of attendant information such as "title", "shooting data and time", "cameraman", and "shooting scene", while operating the database making control input circuit 43A, and can display the made database data on the monitor 43D.

In this embodiment, the database data making circuit 43C specifies the database data stored in the database storing unit 44, for example, for each news material, or for a desired range, or allows scrolling through the memory area of the database storing unit 44, to display the database data on the monitor 43D, thus making it possible to confirm the made database.

The editing operators of a plurality of editing units 45A, 45B, . . . , 45N use the database for accessing the news materials, so that the video data of each item of news material stored in the video data storing unit 42 can be easily edited as a television program.

Figure 7:
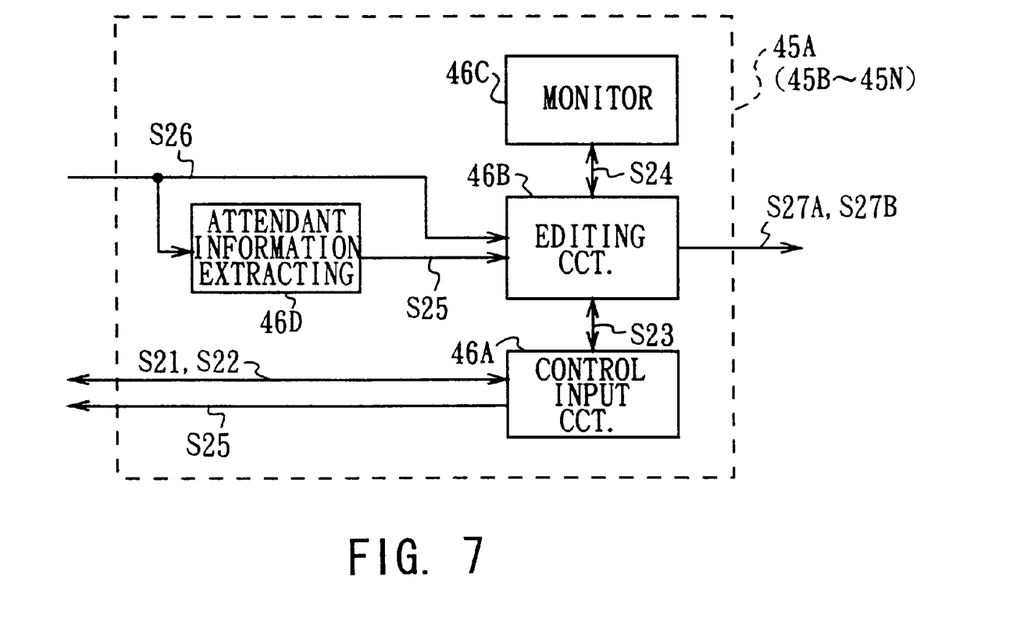
FIG. 7 is a block diagram showing a detailed structure of the editing unit of FIG. 3.

As shown in FIG. 7, the editing operators operate an edit control input circuit 46A so that the editing units 43A to 45N supply the input database readout signal S21 to the database storing unit 44. The database readout signal S21 specifies one or some of the contents of the attendant information corresponding to each item of news material, of the database data, such as "title", "shooting date and time", "cameraman", and "shooting scene" as a keyword. All of the attendant information including the specified keyword is read out with the address data representing the position where the transmission video data is stored, and transmitted again to the edit control input circuit 46A as a response signal S22.

At this time, the edit control input circuit 46A communicates with an editing circuit 46B by a communication signal S23 and outputs display information S24 from the editing circuit 46B to the monitor 46C. Therefore, the contents of the response signal S22 from the database storing unit 44 is displayed on a monitor 46C, so as to show the visual editing information for the editing operators.

In this way, the editing operators can specify the absolute address of news materials to be edited one by one from the edit control input circuit 46A, while referring to the editing information. At this time, the edit control input circuit 46A supplies the video data readout signal S25 to the video data storing unit 42 to transmit the video data stored in the specified absolute address to the editing circuit 46B and to an attendant information extracting circuit 46D as editing material data S26.

The attendant information extracting circuit 46D extracts the attendant information inserted in the transmitted editing material data S26 and supplies it to the editing circuit 46B as attendant information data S25.

At this time, the editing circuit 46B superimposes the extracted attendant information on the video of the transmitted editing material data S26, based on the communication signal S23 supplied by the editing operators from the edit control input circuit 46A, and displays it on the monitor 46C so as to show the contents of news materials for the editing operators visually.

Therefore, the editing operators input the edit command information from the edit control input circuit 46A as the communication signal S23, while looking at the video displayed on the monitor 46C with the attendant information, so as to perform the edit processing such as assembling edit, insertion edit, feed-in edit, feed-out edit, or the like in the editing circuit 46B.

The edited video data edited at the editing units 45A, 45B, . . . , 45N is recorded in the recording unit 47 (FIG. 3) as news program data S27A so as to be arranged in the order of time of broadcasting. The news program data S27A is reproduced from the recording unit 47 at the time of broadcasting and output to the transmission line 49 to the broadcasting antenna through a broadcasting signal output unit 48.

The broadcasting system 10 in this embodiment is so constructed that the edited video data of the editing units 45A, 45B, . . . , 45N is directly supplied to the broadcasting signal output unit 48 as urgent news data S27B, thereby an important program can be output rapidly when necessary.

Further, the broadcasting system 10 in this embodiment is so constructed that the transmission video data S5 received from the transmission line 21 is directly supplied to the broadcasting signal output unit 48, so that it is possible to broadcast an on-the-spot broadcasting program separately from the urgent news data S27B of the editing units 45A, 45B . . . , 45N or the news broadcasting program data S27A of the recording unit 47.

With the above construction, in the video data transmitting unit 11 which is carried to the shooting scene, when the video of news materials is shot by the television camera 21, the attendant information ("title", "shooting date and time", "cameraman", and "shooting scene") input via the respective data input ports 25A to 25D of the data input port part 25 is inserted, at the composite/transmitting unit 23, in the user's bits of the vertical interval time code (VITC) provided at the 12th and 14th lines in the vertical blanking interval for each field or frame of the material video data S2 obtained from the television camera 21 at the VITC coding circuit 31.

Thus, the attendant information data S3 inserted in the material video data S2 is inserted in the vertical blanking interval, so that it is stored in the video data storing unit 42 of the broadcasting station STN as a part of the data stream of news materials without adversely affecting the material video data S2.

Because the characteristic attendant information is inserted for each item of news material, the transmission video data stored in the video data storing unit 42 uses the attendant information as a keyword so as to easily and correctly select and retrieve a desired item of news material from a plurality of news materials having various contents.

As a result, it becomes easier to sort out the news materials in the database making unit 43, so that a database having an appropriate storing form can be constructed in the database storing unit 44.

When retrieving a desired news material from the database storing unit 44 to edit a program in a plurality of editing units 45A, 45B, . . . , 45N, the operators can edit while always confirming the attendant information inserted in each news material, so as to edit a program easily and correctly.

For instance, when the news material of "the press conference of Prime Minister in Apr. 1, 1996" is edited in either of the editing units 45A to 45N, if an editing operator inputs the read out signal S21 specified by using the shooting date and time "Apr. 1, 1996" as a first keyword and the title "Prime Minister" as a second keyword from the edit control input circuit 46A, the address data of all attendant information having the keywords "Apr. 1, 1996" and "Prime Minister" as the shooting date and time and the title, respectively, is retrieved in the video data storing unit 42. As a result, the video data read out is supplied to the editing units 45A to 45N as editing material data S26.

Therefore, the editing operator uses the attendant information inserted in the video signal to identify news material using a keyword to easily retrieve the necessary video from the video data storing unit 42.

With the above construction, the attendant information data is inserted in the data stream of the video data, so that it can be utilized as a sort-out processing means for making a database when the video data is transmitted. Therefore, the database can be constructed easily and correctly.

Further, when a plurality of operators respectively edit using the editing units, the operators can obtain the attendant information to confirm the contents of the video data easily and correctly.

Figure 8:
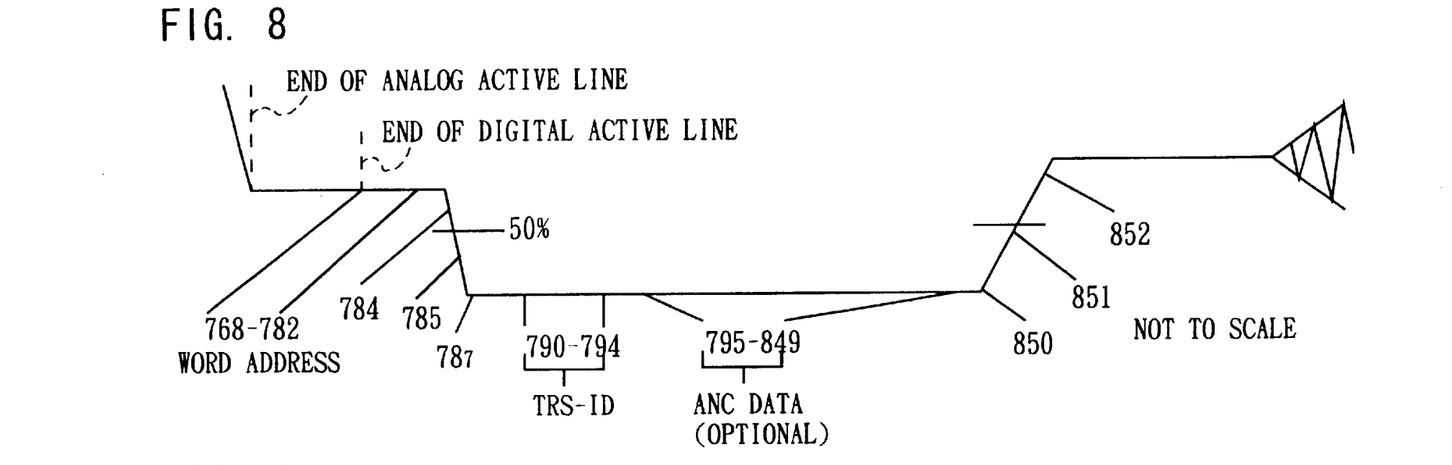
FIG. 8 is a block diagram showing another embodiment of the video signal transmitting apparatus according to this invention.

In FIG. 8, 50 represents a video signal transmitting apparatus for transmitting video data S65 generated by a video data transmitting section 60 to a video data receiving section 70 through a transmission line 67.

That is, in the video data transmitting section 60, after an analog video signal S61 generated by shooting is converted into a digital video signal S62, the video data S65 is formed by adding an attendant information signal S63 to the digital video signal S62 using an attendant information adding section 61 and outputting the video data S65 to the transmission line 67.

The video data receiving section 70 receives the video data S65 from the video data transmitting section 60 and separates the analog video signal S61 and the attendant information signal S63.

In the video data transmitting section 60, after the analog video signal S61 formed by a shooting unit 62, such as a television camera, is converted into the digital video signal S62 via an analog-to-digital converter 63, the digital video signal S62 is supplied to a signal synthesizing circuit 64, which constitutes part of the attendant information adding section 61.

On the other hand, by operation of an operator, an attendant information input section 65, which constitutes part of the attendant information adding section 61, generates the attendant information signal S63 to be output to the signal synthesizing circuit 64. The signal synthesizing circuit 64 forms a synthesizing signal S64 by adding the attendant information signal S63 to the digital video signal S62, and the synthesizing signal S64 is output to a parallel/serial converter 66.

As a means for inputting attendant information, the attendant information input section 65 has previously-recorded attendant information in a recording medium like an IC card and reads the attendant information recorded in the IC card using the attendant information input section 65, so that the attendant information can be easily input to the video data transmitting section 60.

The parallel/serial converter 66 forms the video data S65 by converting the synthesizing data S64, which is a parallel signal, to a serial signal, and the video data S65 is output to the video data receiving section 70 through the transmission line 67. The transmission line 67 can be a coaxial cable, for example.

That is, in the video data transmitting section 60, the digital video signal S62 and the attendant information signal S63 are synthesized by the attendant information adding section 61, thereby the attendant information is included as a part of a video data S65 without preventing the video from being looked at and listened to.

The video data transmitting section 60 adds the attendant information to the video signal S62 in the signal synthesizing circuit 64 by means described below.

In an apparatus which transmits and records a video signal used for a broadcast, EIA (Electric Industries Association) RS-170A is provided as a standard, and SMPTE (Society of Motion Picture and Television Engineers) 259M is provided as an interface of a digital signal with the digitalization of the signal. In the standard and the interface, a transmitting block is formed at every prescribed time for each video signal of one field or one frame, and the video signal is digitalized and inserted in the block.

In the block, in addition to an area where a video signal and a synchronism signal, essentially being an analog signal, are digitalized and inserted, a blanking area where other information can be inserted exists. The blanking area is previously arranged to be freely used by a user of the standard.

Then, the attendant information is added to the video signal by inserting it in the blanking area with the digitalized attendant information. Therefore, the attendant information can be added to the video signal without preventing the video from being looked at and listened to, and the video and the attendant information are combined and transmitted without expending a great deal of time.

In the video data receiving section 70, the video data S65 transmitted through the transmission line 67 is input to a serial/parallel converter 71 where the video data S65, which consists of a serial signal, is converted into the synthesizing signal S64, which consists of a parallel signal, and is the output to the signal separating circuit 72. The signal separating circuit 72 separates the attendant information S63 and the digital video signal S62 from the synthesizing signal S64. The attendant information signal S63 is output to an outside unit, and the digital video signal S62 is transmitted to the digital-to-analog converter 73. Then, the digital-to-analog converter 73 converts the digital video signal S62 into the analog video signal S61 and outputs it to an outside unit.

That is, the video data receiving section 70 provides the signal separating circuit 72 which is an a information extraction means for extracting the attendant information inserted in the blanking area of a transmitting block, therefore the video data S65 can be separated into the video signal S61 and the attendant information signal S63 and the attendant information, which was added to the video signal S61 and transmitted, can be extracted from the video data S65.

The aforesaid embodiments have been used for the case where user's bits of the VITC time code inserting interval provided in vertical blanking intervals are utilized for inserting the attendant information in the video data. However, this invention is not limited to this, and the attendant information can be inserted by utilizing an ancillary data interval (the word address is 795 to 849 interval) provided in a horizontal synchronizing interval of the NTSC composite digital signal based on the SMPTE 259M standard, as shown in FIG. 9.

Figure 10A:
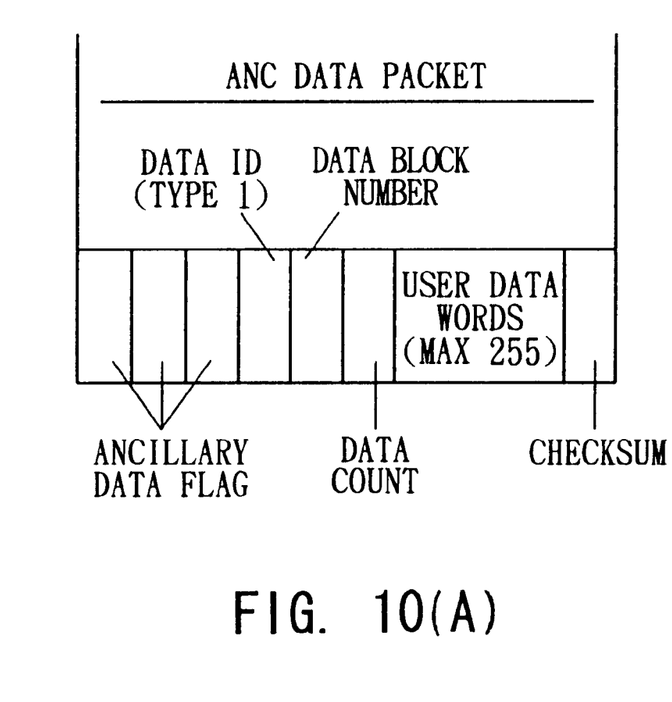
FIG. 10 is a schematic diagram showing a format during an ancillary data interval provided in a NTSC vertical synchronizing interval.
Figure 10B:
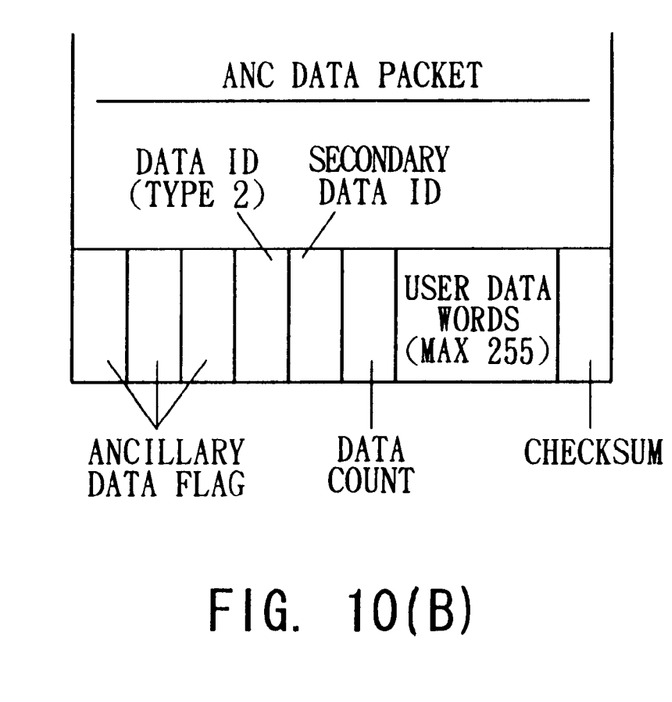

In addition to this, or separately from this, as shown in FIG. 10, the attendant information can be inserted in an ancillary data interval (the word address is 795 to 849interval and 340 to 715 interval) provided in vertical synchronizing intervals.

Figure 9:
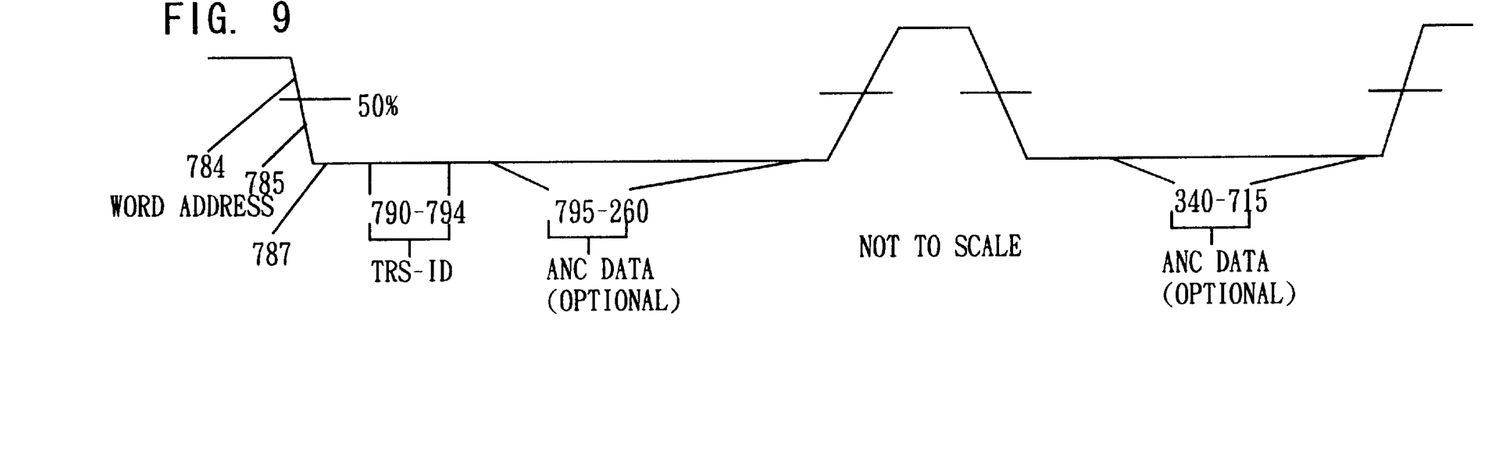
FIG. 9 is a schematic diagram showing a format during an ancillary data interval provided in a NTSC composite digital horizontal synchronizing interval of the SMPTE 259M standard.
Figure 11A:
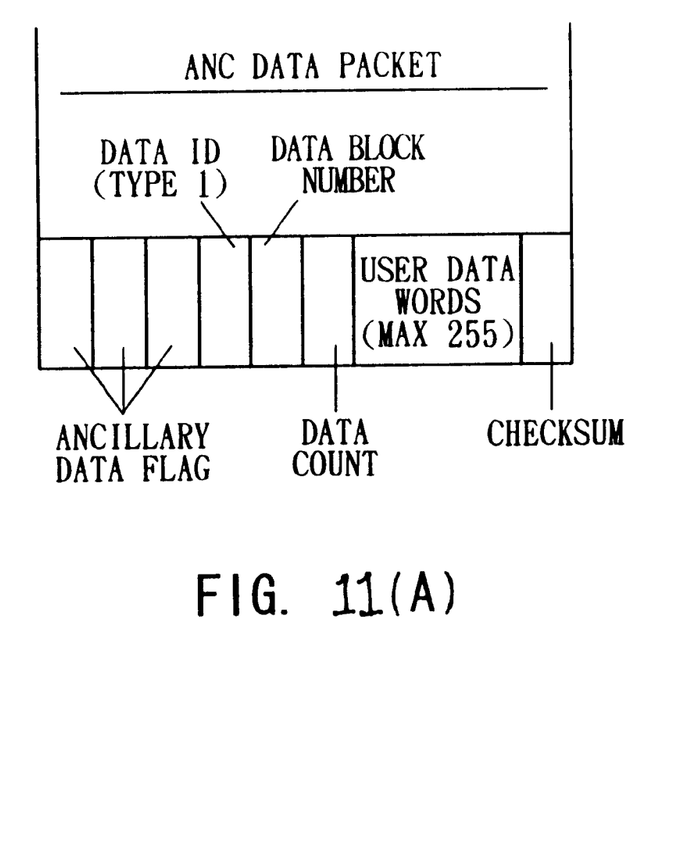
FIGS. 11(A) and 11(B) are schematic diagrams explaining an ancillary data packet used for the ancillary data interval of FIGS. 9 and 10.

In the case of FIGS. 9 and 10, as shown in FIG. 11(A), it is prescribed that a first form of an ancillary packet is formed by user data words and checksum in addition to ancillary data flag, data ID of type 1, data block number, and data count.

Figure 11B:
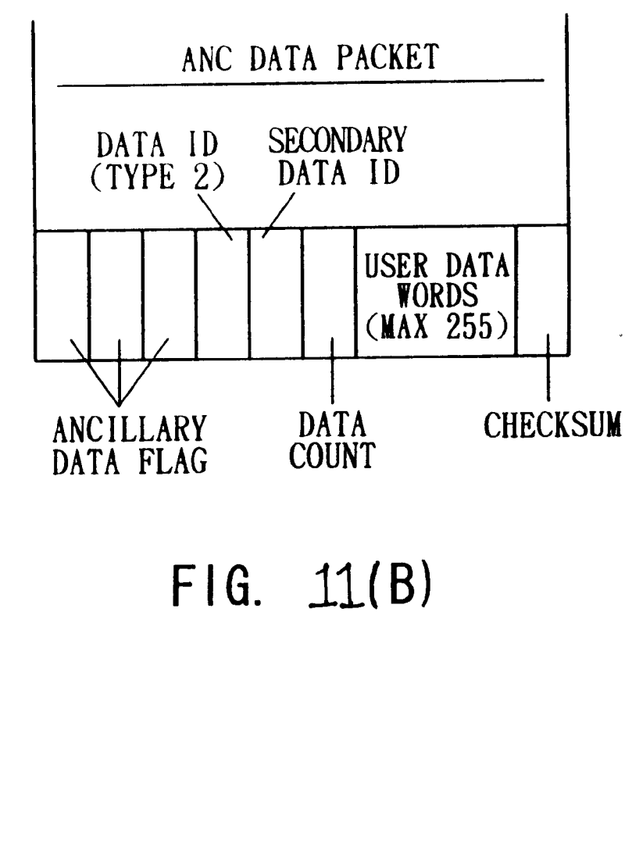

Further, as shown in FIG. 11(B), it is prescribed that a second form of an ancillary packet is formed by user data words and checksum in addition to an ancillary data flag, data ID of type 2, secondary data ID, and data count.

If the attendant information is inserted in the user data words of these data packets, the attendant information can be transmitted together with the video data similar to the above embodiment, and a video signal transmitting apparatus capable of making a database and editing easily and surely can be realized.

Further, the aforesaid embodiment has been used for the case where "title", "shooting date and time", "cameraman", and "shooting scene" are specified as an attendant information. However, this invention is not limited to this, and a maker code for identifying the maker of shooting unit, a model name of a shooting unit such as "mechanic IC", "serial number of machine", "cassette number", and "shot number" for identifying the shot scene, etc., can be used as necessary, and "brief description" can also be used instead of title. The use of such information also can obtain the same effects as the above embodiment.

Further, the aforesaid embodiment has been used for the case where in the video data transmitting part 11 which is carried to the shooting scene, the video signal obtained from the video camera 21 is input to the composite/transmitting unit via the analog-to-digital converting circuit 22 in real time. However, this invention is not limited to this, and the video signal S1 of the television camera 21 is once recorded in the recording unit such as a magneto-optical (MO) recording unit and a video tape recorder, thereafter, the video signal S1 can be read out from the recording unit at the time of transmitting the transmission video data S5 from the video data transmitting part 11 and supplied to the composite/transmitting unit 23, so as to insert the attendant information data S3.

Further, the aforesaid embodiment has been used for the case where the attendant information is inserted in all of the news materials before being transmitted to the broadcasting station. However, this invention is not limited to this, and when reusing a video of which the news material has been made in the past and stored without the attendant information, the attendant information can be inserted as necessary at the broadcasting station.

Further, the aforesaid embodiment has been used for the case where an operator specifies the attendant information as a keyword when the video data is edited in the editing units 45A to 45N and the video data is read out from the database storing unit 42. However, this invention is not limited to this, and the database data stored in the database storing unit 44 can be read out as a list to display on the monitor 46C, so as to show it as an editing information for the operator.

Furthermore, the aforesaid embodiment has been used for the case where the database data stored in the database storing unit 44 is used to edit the video data stored in the video data storing unit 42 by a plurality of editing units 45A to 45N respectively. However, this invention is not limited to the case of providing a plurality of editing units, and the editing by one editing unit can obtain the effect that the video data of the video data storing unit 42 is edited easily and surely by using the attendant information stored in the database storing unit 44.

INDUSTRIAL APPLICABILITY

This invention can be used for a video signal transmitting apparatus which stores and edits the video signal with the attendant information having an important meaning to specify the content of each video.

What is claimed is:

1. A video signal transmitting apparatus comprising:

a video data transmitting unit for creating transmission blocks in one field or one frame of a video signal and forming transmission video data, said video data transmitting unit including attendant information inserting means for inserting in a blanking interval in said transmission blocks attendant information representing contents of said video signal; and a video data receiving unit for receiving said transmission video data formed by said video data transmitting unit and reproducing said video signal, said video data receiving unit including recording and reproducing means for recording said transmission video data received by said video data receiving unit, reproducing said video signal, and extracting only said attendant information from said transmission video data when said contents of said video signal are confirmed by a user of said video signal transmitting apparatus, and display means for displaying said attendant information extracted by said recording and reproducing means.

2. The video signal transmitting apparatus as set forth in claim 1, wherein said video data transmitting unit is a television camera.

3. The video signal transmitting apparatus as set forth in claim 1, wherein said recording and reproducing means includes information extracting means for extracting said attendant information inserted in said blanking interval in said transmission blocks.

\* \* \* \* \*